3,212,963
TRANS DITHIOCYANOETHYLENE AND ITS DERIVATIVES AS INDUSTRIAL PRESERVATIVES
Donald Clifford Wehner, Stamford, Conn., assignor to American Cyanamid Company, Stamford, Conn., a corporation of Connecticut
No Drawing. Filed Oct. 17, 1961, Ser. No. 145,774
3 Claims. (Cl. 167—22)

This invention relates in general to the control of microorganisms which present problems in various industrial applications. It is particularly directed to methods and compositions for arresting or eradicating infestation of deleterious bacterial growth, algal growths and other micro-organisms harmful to industrial systems.

The novel antimicrobial agents of the present invention and the methods of pest control which involve their use are characterized in that the principal ingredient is a trans dithiocyanoethylene of the structure:

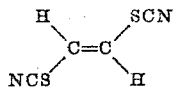

and the 1,2 dihalo ethylene esters thereof wherein the halogen substituent is selected from the group consisting of chlorine, bromine, iodine and fluorine although substitution with bromine is preferred.

It has been found that when the aforesaid compound is introduced into a medium to be protected in quantities of at least 0.5 p.p.m. a rapid diminution in bacterial and algal deterioration is seen to occur and a strong preservative effect is noted in the medium. It has particularly been found that a wide range of micro-organisms of both plant and animal nature are removed by treatment with the instantly disclosed novel antimicrobial agent. As a consequence the infested medium shows evidence of a marked improvement in stability and freedom from deterioration.

During recent years there has been an increasing amount of research conducted on the antifungal and antibacterial properties of various complex organic derivatives of thiocyanic and isothiocyanic acids. In the course of this research certain drawbacks have been noted in the biocidal activity of this class of compounds. In many instances it has been found that the biocidal activity is specific to either one or the other of a number of interfering micro-organisms in the system treated. This, of course, requires additional agents to remove the nonaffected micro-organism with frequent problems of compatibility of the additives and increased cost of preservation to the manufacturer. A second practical deficiency is the relatively high cost of preparing these complex organic thiocyanates because of their difficulty in synthesis.

It is the principal object of the invention, therefore, to disclose a novel organic thiocyanate composition useful as an antimicrobial agent and simultaneously effective against a number of plant or animal interfering microorganisms.

It is a further object of the present invention to disclose as an antimicrobial agent a novel composition comprising as its principal active constituent a compound selected from the group consisting of trans dithiocyanoethylene and the 1,2 dihalo ethylene esters thereof.

In general my invention is based on the discovery that industrial systems subject to infestation with such microorganisms as bacteria and algae may be rendered free thereof by treatment of the infested materials in the system with a minor but effective amount of a composition comprising the trans form of dithiocyanoethylene and the indicated derivatives thereof either alone or in company with diluents, carriers, solvents or the like either prior to or following infestation with the interfering micro-organisms. As a result of treatment of the infested material whether by spraying, direct addition into the formula or other recognized methods of application, it has been found that the dithiocyanoethylene renders the material treated extremely resistant to further infection, inhibits degradation thereof and acts as a preservative for the material.

The term degradation inhibitor may be employed to generally characterize the active ingredient of this invention. By this term it is intended to refer to a chemical agent which will both retard and/or totally prevent the growth of such micro-organisms as bacteria, algae, and the like and substantially prolong and preserve the life of any material either liquid or solid to which it may be added.

The dithiocyanoethylene and dihalo derivatives thereof of the present invention demonstrate a broad spectrum of high level toxicity for a large number of distinctly different and unrelated micro-organisms. The only practical limitation which has been observed as to their activity is the question of their effectiveness in the particular material or system which they are to preserve which must be determined on the basis of trial in each case.

In this regard the dithiocyanoethylenes of the invention have been particularly effective against growth of the bacteria of the species Bacillus, Aerobactor, Pseudomonas, Desulfovibrio; and the algae of the species Chlorella, Oscillatoria, Ankistrodesmus, Chlamydomonas, Phlormidium at concentrations less than 70 parts per million and frequently as low as 2 parts per million which illustrates the potent biocidal activity of the compound.

The subject compounds have been found effective in treating a number of industrial systems and materials subject to deterioration by the activity of various micro-organisms. For instance, they may be employed in keeping paper mill water systems free from algae when employed at a concentration of 25 p.p.m. or less. The use of about 20 p.p.m. or less will protect cooling towers and equipment carrying aqueous fluids from microbial growth of various origin which unchecked will cause corrosion and consequent loss of cooling capacity in the system. Addition of 0.1 to 1% of the compound to adhesive compositions, sizes, glue caulking compounds and other organic caulking materials will prevent discoloring and disfigurement of these materials by microbial degradation. Incorporation of amounts ranging from about .05 to 1% to oleaginous liquids will preserve them from degradation and deterioration by microbial activity while in storage. Quantities of the order of 25 p.p.m. or less of the compound when added to oil well brines and the like will effectively control microbial growth which otherwise would cause plugging of the pipe lines and corrosion of production equipment. A quantity in the order of 500 p.p.m. or less added to drilling muds will protect the starches and gums contained therein from bacteria of the Desulfovibrio type thus preventing corrosion and failure of oil well casing. The use of quantities of the order of 250 p.p.m. or less in a washing or spraying solution employed for treating packed fruits and vegetables will drastically reduce the number of bacteria present and improve the keeping quality and storage life of the produce. The inclusion of amounts of 150 p.p.m. or less to cutting oils has been found to prevent spoilage and offensive odors in the liquid and improvement therein.

An advantage of the substituted thiocyanates of the present invention is that they can be prepared by an inexpensive synthesis from readily available starting materials. Generally a molar equivalent quantity of lead thiocyanate in 100 ml. of benzene is treated with a molar equivalent quantity of bromine at a reaction temperature ranging from 10–30° C. The mixture is agitated until lead bromide is produced which is removed by filtration. The benzene solution of thiocyanogen remaining is irradiated with ultra violet light while acetylene gas is passed in for about 1 hour. The reaction mixture formed is heated under reflux on a steam bath for an additional hour and the solution filtered. The filtrate is partially evaporated and cooled to reduce the trans dithiocyanoethylene of the invention. The halogen derivative may be prepared by conventional halogenation of this product by a number of well known methods.

It is, of course, understood that the trans dithiocyanoethylene ingredient may constitute either the sole or principal active ingredient of a composition containing a number of ingredients. When treating large surface areas it is preferred to blend the active ingredients with a large quantity of an organic alcohol, such as methanol, ethanol and the like. In those cases where it is decided to introduce the dithiocyanoethylene into a plastics formulation, one may of course include a plasticizing agent such as dibutylphthalate. In general, the choice of the particular liquid carrier employed may be guided by prevailing circumstances such as its availability and cost and its solubility and dispersion characteristics toward the active ingredients. From the foregoing it will be appreciated that for biocidal purposes very low concentrations of the active ingredients are effective for inhibiting the various forms of plant and animal life. For optimum results amounts ranging from 0.5 p.p.m. to about 10,000 p.p.m. of the active ingredient may be applied by any one of a number of convenient means. Such as, for example, by the use of nonaqueous solutions or by the use of a suspension, emulsion or dispersion either aqueous or non-aqueous in nature or by the application of the active ingredient with a diluent. Formulations containing the active ingredient are generally applied to the infested material to be treated in the form of a liquid by spraying or as a vapor by fumigation in those cases where this is practical. In still other cases it may be applied in the solid state by dusting or other means. In situations where it is to be added to a material prior to final formulation or where it is added to a composition to preserve the material from further deterioration, it is simply added to the formulation prior to final mixing.

Compositions containing the trans dithiocyanoethylene may be formulated by admixing the active ingredient with any suitable liquid or solid carrier. In the case of solid carriers, those familiar to the dusting art which are favored for their large surface area such as bentonite, kieselguhr, fuller's earth, clay, pyrophylite talc and the like may be employed. Commercial clay carriers are generally acceptable as are nonclay carriers, like lignocellulose, wood flour and such. When solid compositions are employed, it is desirable that the composition be in finely divided form. Preferably the dust containing the active ingredient should be sufficiently fine that substantially all of the particles will pass through a U.S. Standard Sieve Series No. 200 Screen.

On the other hand, when it is desired to apply the active ingredient by spraying techniques, it may be dissolved or dispersed in a liquid carrier. Although lower aliphatic alcohols are preferred, other suitable liquid carriers are water, various oils and organic solvents in which the trans dithiocyanoethylene is known to be soluble. Suitable oils include those of mineral, animal, vegetable or synthetic origin such as kerosene, soy bean oil, castor oil, cod liver oil and the like.

Dispersion and emulsion of the active ingredient in a liquid carrier may be prepared by agitation in the presence of an emulsifying or dispersing agent in order to assist in the formation of an emulsion or dispersion. In such preparation a number of well known emulsifying and dispersing agents may be employed such as sodium lauryl sulfate, aliphatic and aromatic sulfonates like sulfonated castor oil or various alkaryl sulfonates such as the sodium salt of mono sulfonated nonyl naphthalene. Non-ionic types of emulsifying agents such as the higher molecular weight alkyl polyglycol ethers and analogous thio ethers such as the decyl, dodecyl and tetradecyl polyglycol ethers and thio ethers containing from about 25 to 75 carbon atoms may be used. For convenience the emulsifying agent may be mixed with the active ingredient prior to admixture with the carrier and dispersion is accomplished at the place wherein spraying is to be carried on merely by agitating said mixture. This is particularly important when both water and oil are employed as the carrier. The concentration of surfactant in the final emulsion should be sufficient to make the oil and water phases readily dispersible and in general one will employ from about 0.02 to 3% of the surfactant for purposes of forming a spray emulsion or dispersion. Formulations containing a surface active agent in the amount of from 1 to 20% by weight of active ingredient are satisfactory although such proportion may be varied over a wide range of proportions depending upon the particular circumstances and condition of the material to which the active ingredient is to be added.

In the case where cationic emulsifiers such as sodium lauryl sulfate are employed, it is desirous that they be used in combination with a buffering agent to insure that the pH of the liquid being treated does not rise above about pH 8.5 at which point the active ingredient may be impaired by degradation.

Adjuvants such as wetting agents or humectants may, if desired, be employed particularly when compounding an aqueous dispersion. Examples of humectants are glycerine, diethyl glycol, polyethylene glycol and the like. The wetting agents employed such as the many well known commercial nonionic and anionic wetting agents serve an additional purpose particularly in spray application in aiding penetration of the active ingredient into the pores of the substance treated where such is required.

The range of proportions of inert carrier or diluent to the active ingredient is broad and is not considered to be critical. In many cases from about 0.01% to 2% by weight of the active ingredient has been found adequate for the preparation of most aqueous dispersions. In dry compositions up to about 5% of active ingredient is suitable for most applications. It should be understood of course that the active ingredient may be employed by itself or in proportions of much higher concentration if it is desired to be dispensed by aerosol or other like means.

The following examples will serve to illustrate the preparation and some of the more important uses of the new antimicrobial agent. It is intended that these examples are merely to further illustrate the information and are not intended in any way to limit the scope thereof which may only be defined by reference to the claims appended herewith.

*Example I*

Water flooding is employed in oil fields to achieve secondary recovery of petroleum and repressurize oil wells. It normally involves pumping large quantities of water or brine down several wells drilled into an oil producing formation and known as injection wells. The water flows through the formation toward one or more producing wells and carries the petroleum with it.

Sulfate reducing bacteria, principally of the species *Desulfovibrio desulfricans* at this point will if unchecked reduce the sulfates present in the oil to $H_2S$ which will corrode the oil well equipment.

A means of preventing this deterioration is found by adding to the flooding water 2.0 p.p.m. or less of the transdithiocyanoethylene antimicrobial agent of the present invention in company with an emulsifier if needed.

The effectiveness of such agent may be seen in a controlled test as follows:

1. Prepare a sulfate reducer bacteria medium consisting of:

| | | |
|---|---|---|
| Sodium lactate, U.S.P. | ml | 4.0 |
| Yeast extract | g | 1.0 |
| Ascorbic acid | g | 0.1 |
| $MgSO_4 \cdot 7H_2O$ | g | 0.2 |
| $K_2HPO_4$ (anhyd.) | g | 0.01 |
| $Fe(SO_4)_2 \cdot (NH_4)_2 \cdot 6H_2O$* | g | 0.1 |
| NaCl | g | 10.0 |
| Distilled water | ml | 1000 |

* Added after sterilization.

All the ingredients except the iron compound are dissolved in the water by gentle heating with constant stirring and the pH is adjusted to 7.5 with NaOH. If necessary the medium is then filtered. It is autoclaved at 15 lbs. steam pressure for 10 minutes, cooled slightly and the iron salt is added. After cooling, the medium is inoculated by adding ten ml. of inoculum to each liter of medium. The inoculum should be from the third successive 24 hour transfer of an actively growing culture of the sulfate reducing bacteria.

"Mid-Continent Strain A—Texas Company" has been designated by the A.P.I. as the test culture of sulfate reducing bacteria to be used for comparative screening of chemicals. This culture is available from the University of Texas, Department of Bacteriology, at Austin, Texas. It can be carried on the above-described medium after adding 0.3% of agar.

The trans dithiocyanoethylene employed as the bactericide in this example is preferably dissolved first in a carrier such as methyl alcohol to facilitate use. Add aliquots of the mixture to a number of clear glass bottles some of which contain the antimicrobial agents and others which do not. Incubate at 35° C. The growth of sulfate reducing bacteria in the various bottles is indicated by an intense blackening of the medium while containers having sufficient trans dithiocyanoethylene to inhibit growth will remain clear for at least three weeks after the controls have turned black.

Example II

Mix dilutions of trans dithiocyanoethylene with nutrient salt solutions containing 3 g. of $NH_4NO_3$, 1 g. of $K_2HPO_4$, 0.25 g. KCl and inoculate the mixture with an actively growing culture of green algae (Chlorphyceae). Incubate the mixtures in sunny areas of a green house for from two to three weeks and then examine. Grow control flasks containing no trans dithiocyanoethylene and observe a typical green algae growth. On the contrary, the flasks which contain 1.6 p.p.m. or more of trans dithiocyanoethylene shows no growth of algae.

Example III

An industrial cutting oil containing 9% of a hydrocarbon oil of low viscosity in a solution of 1% sodium petroleum sulfonate, 0.3% sodium naphthenate, 0.1% ethanol and 98.6% of water is prepared. Quantities corresponding to 0.01% and 0.5% of trans dithiocyanoethylene based on the weight of the emulsion to which incorporated are found to inhibit the growth of a wide variety of bacteria. Among such microorganisms which would otherwise be found in the untreated product are *Pseudomonas aeruginosa, Aerobacter aerogenes* and the like.

Example IV

A typical formulation containing the antimicrobial agent of the invention useful in treating water systems of the types employed in secondary oil recovery and industrial cooling systems is the following:

| Ingredient: | Percent by weight |
|---|---|
| Trans dithiocyanoethylene | 50 |
| Isopropanol | 24 |
| Non-ionic wetting agent | 1 |
| Water | 25 |

Addition of 10 p.p.m. of the above formulation to a brine such as that used in oil well treatment and secondary oil recovery will reduce the bacterial count of *Desulfovibrio desulfuricans* and prevent the formation of $H_2S$ and corrosion in the system and prevent plugging of the tubing and pipe lines involved.

Example V

One part of trans dithiocyanoethylene is milled with 99 parts of talc to provide a composition suitable for a dusting material to prevent or eradicate infestation of bacteria and like microorganisms.

In place of the talc there may be substituted other diluents such as diatomaceous earth pyrophillite clay and the like and the proportions of the composition varied to give from 1 to 50% of trans dithiocyanoethylene.

While the aforesaid examples are illustrative of the many useful ways to which the novel antimicrobial agents may be put it is obvious that a number of other specific applications will at once become obvious to those concerned in the art. It is the intention of applicant to conceive within the scope of his invention the treatment of any industrial system which may be freed of microbiological infestation and in this respect the agent may be employed wherever considered to be needed.

I claim:

1. A method of inhibiting the growth of algae which comprises contacting said algae with a minor but effective amount of a compound selected from the group consisting of trans dithiocyanoethylene and 1,2-dihalo-1,2-dithiocyanoethane.

2. A method of inhibiting the growth of algae which comprises contacting said algae with a minor but effective amount of trans dithiocyanoethylene.

3. A method of inhibiting the growth of algae which comprises contacting said algae with a minor but effective amount of 1,2-dibromo-1,2-dithiocyanoethane.

References Cited by the Examiner

UNITED STATES PATENTS 2,340,137  1/44  Moore _____ 167—22

OTHER REFERENCES

Foley et al.: Annals of the New York Academy of Sciences, volume 76, Art. 3, pages 413–438, December 5, 1958.

Kaneko et al.: J. Pharm. Soc. Japan, 76, 316–319, 1956.

LEWIS GOTTS, *Primary Examiner.*

MORRIS O. WOLK, *Examiner.*